April 29, 1930. F. Y. WYNKOOP 1,756,273
SIGNAL CAP FOR PNEUMATIC TIRES
Filed Sept. 11, 1928
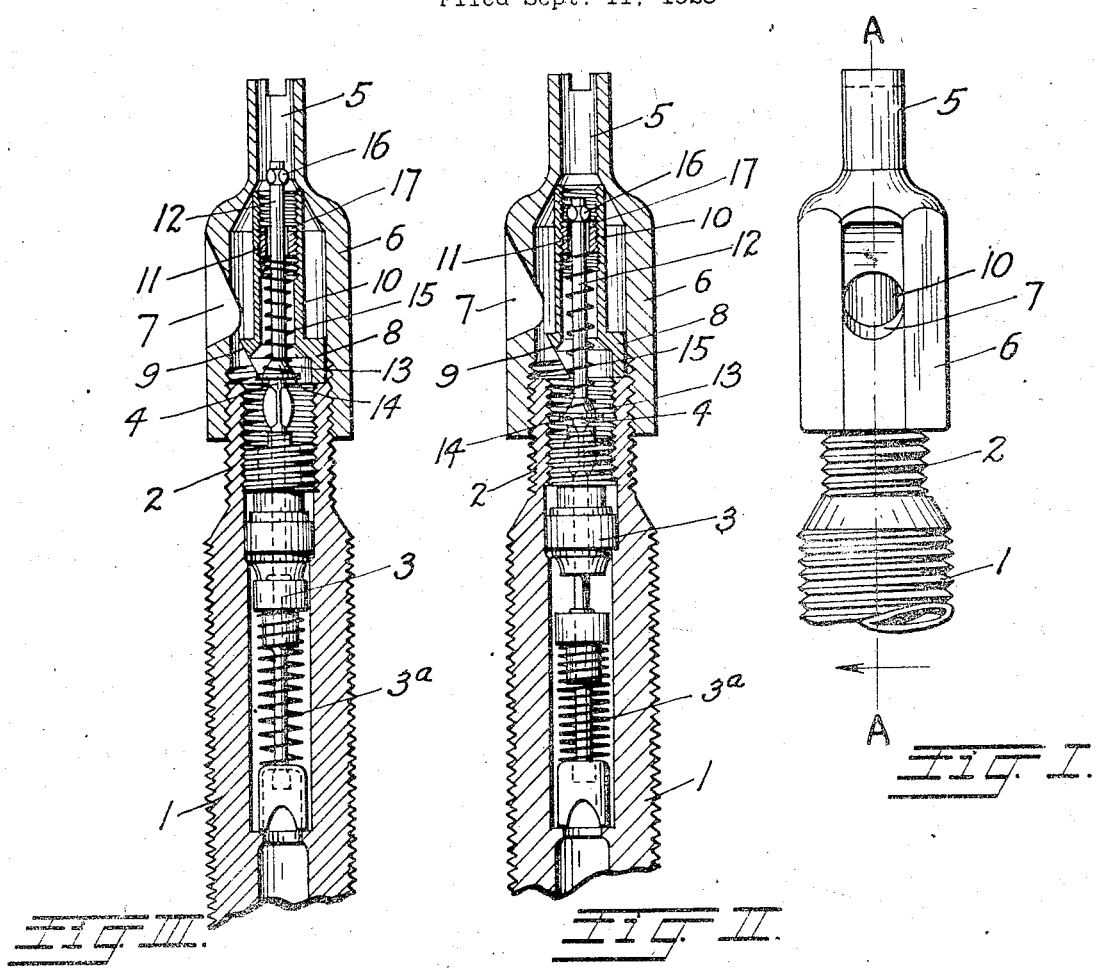
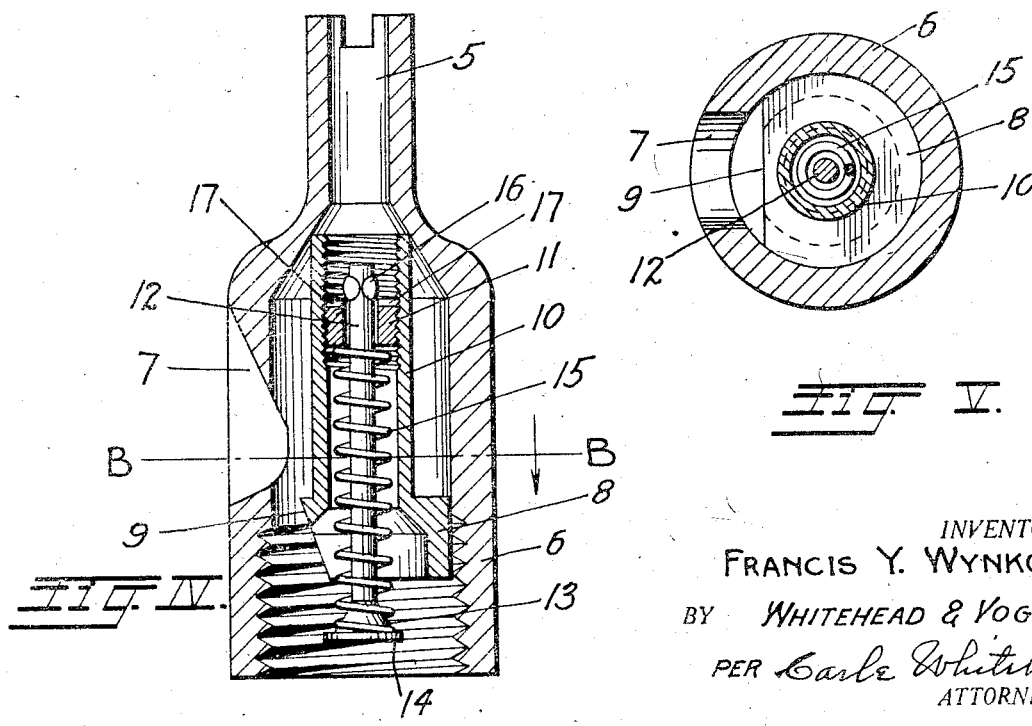
INVENTOR.
FRANCIS Y. WYNKOOP
BY WHITEHEAD & VOGL
PER Carle Whitehead
ATTORNEY.

Patented Apr. 29, 1930

1,756,273

UNITED STATES PATENT OFFICE

FRANCIS Y. WYNKOOP, OF DENVER, COLORADO

SIGNAL CAP FOR PNEUMATIC TIRES

Application filed September 11, 1928. Serial No. 305,163.

This invention relates to signals for indicating subnormal pressure in pneumatic tires and particularly to that class of such signals in which a spring-operated plunger forces open the tire valve when the pressure in the tire falls below a predetermined point, thus allowing the air in the tire to escape through the valve and into the signal device for operating the signal.

An object of the present invention is to provide such a device wholly contained within a tire valve cap of substantially standard construction.

A further object is to provide such a device of the utmost simplicity and durability as to structure and operation.

A further object is to so simplify, and combine the parts of, such a device as to reduce the cost of production thereof to a practically nominal figure.

A further object is to simplify the adjustment of such a device to a variety of degrees of pressure.

These and other objects will more fully appear from the following specification and appended claims as illustrated in the accompanying drawing in which like characters of reference indicate corresponding parts throughout the several views and in which Figure I is an elevation of my signal cap for tire valves attached to the standard threaded reduced end of a tire valve casing. The cap is here shown approximately two and one half times normal size.

Figure II is a longitudinal section on line A—A of Fig. I, produced to show the complete tire valve and showing such valve forced open by the spring plunger in the cap after reduction of pressure in the tire below the predetermined point.

Figure III is the same as Fig. II except that all parts are shown in normal position as when pressure in the tire is above the predetermined point.

Figure IV is a greatly enlarged longitudinal section of the signal cap showing details of structure.

Figure V is a section on line B—B of Fig. IV.

The cap is shown octagonal in Fig. I and round in Fig. V. It will be understood that any desired external contour may be used.

My signal cap may be attached to any tire valve casing 1, being screwed onto the standard threaded reduced end 2 thereof such casing containing any tire valve, a standard valve structure being here shown within the casing 1 and generally indicated at 3 and having a stem 4 centrally of the casing 1 and projecting upwardly therein to a point near the upper or outer end of the casing 1.

My signal cap is designed for attachment to said reduced end 2 for covering and protecting the open end thereof and the contained parts and for sounding a signal when the tire pressure falls below a predetermined point and this cap, with its contained parts, constituting my invention, is shown complete, but sectionally, at Fig. IV and is described as follows:

I provide a cap of substantially standerd valve-cap construction having a standard hollow tip 5 and a barrel 6 preferably about twice the length of the barrel of the standard valve cap. In the wall of the barrel 6 I provide a notch 7 for forming a whistle. Into the barrel 6 I press-fit a hollow plug 8, cut away at 9, to permit passage of air to whistle 7, and carrying a tube 10 centrally of barrel 6 and extending to a point of contact with the inner wall of barrel 6 near the base of tip 5.

Within tube 10 I thread a plug 11 centrally in which is slidingly mounted a plunger 12 having a cone shaped base 13 with a rim 14, encircling which plunger and seated on the plug 11 at one end and on the cone base 13 at the other end, is a compression coil spring 15. The upper end of plunger 12 is provided with means as lugs 16 to prevent its sliding through plug 11.

Plug 11 is provided in its upper side with slots 17 for engagement with a key insertable through tip 5 for turning plug 11 for screwing said plug to the desired position in the threaded portion of tube 10.

Plunger 12 may have a loose fit in plug 11 as the spring 15 engaging conical base 13, in such case, resiliently centers the plunger 12.

When my signal cap is screwed onto the end 2 of the valve casing 1, the base of plunger 12 presses against the upper end of valve stem 4 as clearly shown at Fig. III, the air pressure in the tire, plus the pressure of valve spring 3ª being sufficient to hold valve 3 closed.

Plug 11 is so set in tube 10 that when the cap is thus screwed onto end 2 stem 4 will force the plunger 12 upwardly and compress spring 15 to a point at which it will overcome the valve closing pressure of the combined valve spring 3ª and the tire air pressure when the tire air pressure has been reduced to the predetermined point.

For example, assume that the pressure of spring 3ª against valve 3 is equal to four ounces and the air pressure from the tire against the valve, when the pressure in the tire is twenty pounds to the square inch, is two ounces making a total pressure on valve 3 of six ounces. In such case plug 11 is so set in tube 10 that when the cap is positioned on the reduced end 2 spring 15 will exert six ounces of pressure on plunger 4. Thus when the tire pressure drops below twenty pounds to the inch, the closing pressure on valve 3 will drop below six ounches and the pressure of spring 15 on stem 4, through plunger 12 and base 13, being six ounces, will open valve 3 thus allowing the air from the tire to escape therethrough, past the cut off 9 of plug 8 and out through whistle 7, sounding the whistle as it passes therethrough.

The adjustment is readily made as follows. Bring the tire pressure to the highest point at which a signal is desired. Attach the cap. Insert a key through tip 5 and screw down plug 11 until the signal sounds. Remove the cap and inflate the tire to the pressure desired for use. Replace the cap leaving plug 11 set at that point and the signal will sound whenever the tire pressure is reduced to said point.

It will be noted that the bottom of plug 8 forms a positive stop against which the end of valve case 1 rests. Thus the parts are positively relatively positioned except for the adjustment of the plug 11 as above described.

I am aware that many devices of this class have been patented. Some involve a change in the valve or valve casing. Some have too many parts or require too fine a construction or too exact or difficult adjustment to permit of easy or efficient operation. Some are too costly of construction to permit of commercial use thereof. For one or more of the above or similar reasons none of said devices has come into general use.

I have provided and herein described a signal cap wherein I have so simplified and improved the structure and combined the parts as to provide positive and simple adjustment, efficiency in operation and durability, all produced at an expense so low, largely because of such simplicity, as to make the cost of the finished article almost nominal.

It will be understood that changes in detail of construction may be made within the spirit of the invention and scope of the appended claims.

I claim:

1. In a tire-valve-casing cap a subnormal pressure indicator comprising a whistle in the wall of the cap, a plug carrying a tube centrally within the cap, and a spring operated plunger adjustably and slidably mounted within the tube and having a spring stop at one end adapted to press against the tire valve stem when the cap is positioned on the casing, said plug forming a stop for the end of the casing.

2. In a tire-valve-casing cap a subnormal pressure indicator comprising a whistle in the wall of the cap, a plug carrying a tube centrally within the cap, and a spring operated plunger adjustably and slidably mounted within the tube and having an automatically centering spring stop at one end adapted to press against the tire valve stem when the cap is positioned on the casing, said plug forming a stop for the end of the casing and being cut away to permit air to pass from the casing to the whistle.

3. In a signal cap for tire valve casing, a whistle in the cap, and means within said cap for opening the tire valve and permitting air to pass therethrough from the tire to the whistle, said means comprising a plug within the cap and forming a stop for the end of the valve casing, a tube carried by the plug, and within the cap, a second plug adjustably mounted within the tube and a spring-operated plunger slidably carried by said second plug and adapted to resiliently press against the tire valve stem when the cap is positioned on the casing.

4. In a signal cap for tire valve casing, a whistle in the cap, and means within said cap for opening the tire valve and permitting air to pass therethrough from the tire to the whistle, said means comprising a plug within the cap and forming a stop for the end of the valve casing, a tube carried by the plug, and within the cap, a second plug adjustably mounted within the tube and a spring-operated plunger slidably carried by said second plug and adapted to resiliently press against the tire valve stem when the cap is positioned on the casing, said second plug having key engaging means and said cap having an aperture for insertion of a key to engage said means for adjusting said second plug from without said cap.

5. In a signal cap for tire valve casing, a whistle in the cap and means within said cap for opening the tire valve and permitting air to pass therethrough from the tire to the whistle, said means comprising a plug press-fitted into the cap and forming a stop for the end of the valve casing, a tube carried by the plug, and within the cap, a second plug adjustably mounted within the tube and a spring-operated plunger slidably carried by said second plug and adapted to resiliently press against the tire valve stem when the cap is positioned on the casing.

6. A tire valve casing signal cap comprising a barrel threaded for attachment to the casing at one end and having an aperture in its other end, a plug in the barrel carrying a tube in axial alignment with the aperture, a second plug adjustably mounted in the tube, a plunger slidably carried by the second plug, an expansible spring encircling the plunger and seated between the second plug and a stop carried at the end of the plunger and key engaging means on the second plug in alignment with the aperture.

7. In a tire valve casing signal cap an adjustable plug, a plunger slidably mounted in the plug, an expansible spring encircling the plunger and seated at one end against the plug and at its other end upon a stop carried by the plunger and cone shaped for centering the spring, key engaging means on the plug and an aperture in the cap adapted to admit a key to engage said means.

8. In a tire valve casing signal cap an adjustable plug, a plunger slidably mounted in the plug, an expansible spring encircling the plunger and seated at one end against the plug and at its other end upon a stop carried by the plunger, key engaging means on the plug and an aperture in the cap adapted to admit a key to engage said means.

In testimony whereof I affix my signature.

FRANCIS Y. WYNKOOP.